United States Patent
Pan

(10) Patent No.: US 9,492,034 B2
(45) Date of Patent: Nov. 15, 2016

(54) FOLDABLE PAN

(71) Applicant: X.J. Electrics (Hubei) Co., Ltd, Huanggang (CN)

(72) Inventor: Yun Pan, Huanggang (CN)

(73) Assignee: X.J. ELECTRICS (HUBEI) CO., LTD, Huanggang (CN)

( * ) Notice: Subject to any disclaimer, the term of this patent is extended or adjusted under 35 U.S.C. 154(b) by 88 days.

(21) Appl. No.: 14/485,152

(22) Filed: Sep. 12, 2014

(65) Prior Publication Data
US 2016/0029828 A1   Feb. 4, 2016

(30) Foreign Application Priority Data
Aug. 4, 2014   (CN) ..................... 2014 2 0436440 U

(51) Int. Cl.
| A47J 45/06 | (2006.01) |
| B65D 25/28 | (2006.01) |
| A47J 27/00 | (2006.01) |
| B25G 3/38 | (2006.01) |

(52) U.S. Cl.
CPC .............. *A47J 45/061* (2013.01); *A47J 27/002* (2013.01); *A47J 45/06* (2013.01); *B25G 3/38* (2013.01); *B65D 25/2802* (2013.01); *Y10T 16/469* (2015.01); *Y10T 16/4707* (2015.01); *Y10T 16/4719* (2015.01); *Y10T 74/20738* (2015.01)

(58) Field of Classification Search
CPC ...... A47J 27/002; A47J 45/06; A47J 45/061; B65D 25/2802; Y10T 16/4719; Y10T 16/4707; Y10T 16/469; Y10T 74/20738; B25G 3/38

USPC ....................... 220/573.1, 759, 763
See application file for complete search history.

(56) References Cited

U.S. PATENT DOCUMENTS 6,173,860 B1 *   1/2001   Lamers ................ A47J 45/061
                                                220/573.1

FOREIGN PATENT DOCUMENTS

FR            2883153       *  9/2006  ............ A47J 45/061

* cited by examiner

Primary Examiner — Fenn Mathew
Assistant Examiner — Elizabeth Volz
(74) Attorney, Agent, or Firm — Hamre, Schumann, Mueller & Larson, P.C.

(57) ABSTRACT

A foldable pan includes a pan body, and a handle connected to an outside of the pan body. A horizontal rotation mechanism is arranged between the handle and the pan body. The handle and the pan body form a horizontal rotation connection by the horizontal rotation mechanism. The horizontal rotation mechanism includes a rotation head, a base, and a spindle assembly. The rotation head is formed at an end of the handle. The spindle assembly passes through a top of the base and the rotation head to form the horizontal rotation connection, and further, a bottom of the base is fastened to the pan body by a connection assembly. The foldable pan with a foldable handle provided in the present invention reduces store space of the pan and is convenient to store, further the package volume is reduced after being folded, thus reducing transfer cost.

7 Claims, 5 Drawing Sheets

FOLDABLE PAN

TECHNICAL FIELD

The present invention relates to a pan structure technology field, and particularly to a foldable pan.

BACKGROUND

In the market, a handle of a known pan generally is fixed, and thus results in a larger volume of the pan, and correspondingly results in a larger package volume of the pan, thereby increasing the transportation costs and decreasing profits. Additionally, the pan with fixed handle takes a large kitchen space to store and it is either not benefit to store.

SUMMARY

The object of the present invention is to provide a foldable pan, which is intend to solve the known pan's problem of having a large volume and taking a large space to cause increase of the transportation costs and being inconvenient to store after use.

The present invention is realized by providing a foldable pan which includes a pan body and a handle connected to an outside of the pan body. A horizontal rotation mechanism is arranged between the handle and the pan body. The handle and the pan body form a horizontal rotation connection by the horizontal rotation mechanism. The horizontal rotation mechanism includes a rotation head, a base, and a spindle assembly. The rotation head is formed at an end of the handle. The spindle assembly passes through a top of the base and the rotation head to form the horizontal rotation connection, and further, a bottom of the base is fastened to the pan body by a connection assembly.

Preferably, the spindle assembly includes a spindle with a screw hole and a first screw engaging with the screw hole. One end of the spindle passes through the rotation head and the base, and the other end of the spindle resists against an upper side of the rotation head. One end of the first screw extends into the screw hole to connect and the other end of the first screw resists against a lower side of the base.

Preferably, the foldable pan further includes a locking mechanism for locking to position, the locking mechanism includes a rotary baffle ring, a button, and a spring. The rotary baffle ring is arranges inside a top of the base. A lower end of the button passes through the rotation head and then extends inside the base to engage with the rotary baffle ring. The two ends of the spring respectively resist against the button and the rotation head.

Preferably, a hole is defined in the central of the rotary baffle ring, baffle pieces are extended inwardly from an edge of the top of the hole, protruding blocks are protruded outwardly from an outer wall of the lower end of the button and engaged with the baffle piece.

Preferably, positioning blocks are protruded outwardly from an outer wall of the rotary baffle ring and an inner wall of the receiving slot of the base defines positioning slots for engaging with the positioning blocks.

Preferably, the connection assembly includes a fixing member, a connecting member, and a second screw. One end of the fixing member contacts the outer wall of the pan body and is fixed by a rivet. The other end of the fixing member extends inside the lower end of the base and is fastened by the second screw. The connection member is wrapped around the fixing member. Further the two ends of the connection member respectively resist against the pan body and the base.

Comparing with the known technology, the foldable pan with a foldable handle provided in the present invention reduces store space of the pan and is convenient to store, further the package volume is reduced after being folded, thus reduces transportation cost.

DETAILED DESCRIPTION OF THE PREFERRED EMBODIMENTS

In order to clearly describe the object, technical solutions, and advantages of the present invention, the accompanied drawings and embodiments are used to describe the present invention in detail. It should be understood, the embodiments described here intends to explain the present invention, and do not intend to limit the present invention.

The implementation of the present invention will be described in detail with the embodiment.

Figure 1:
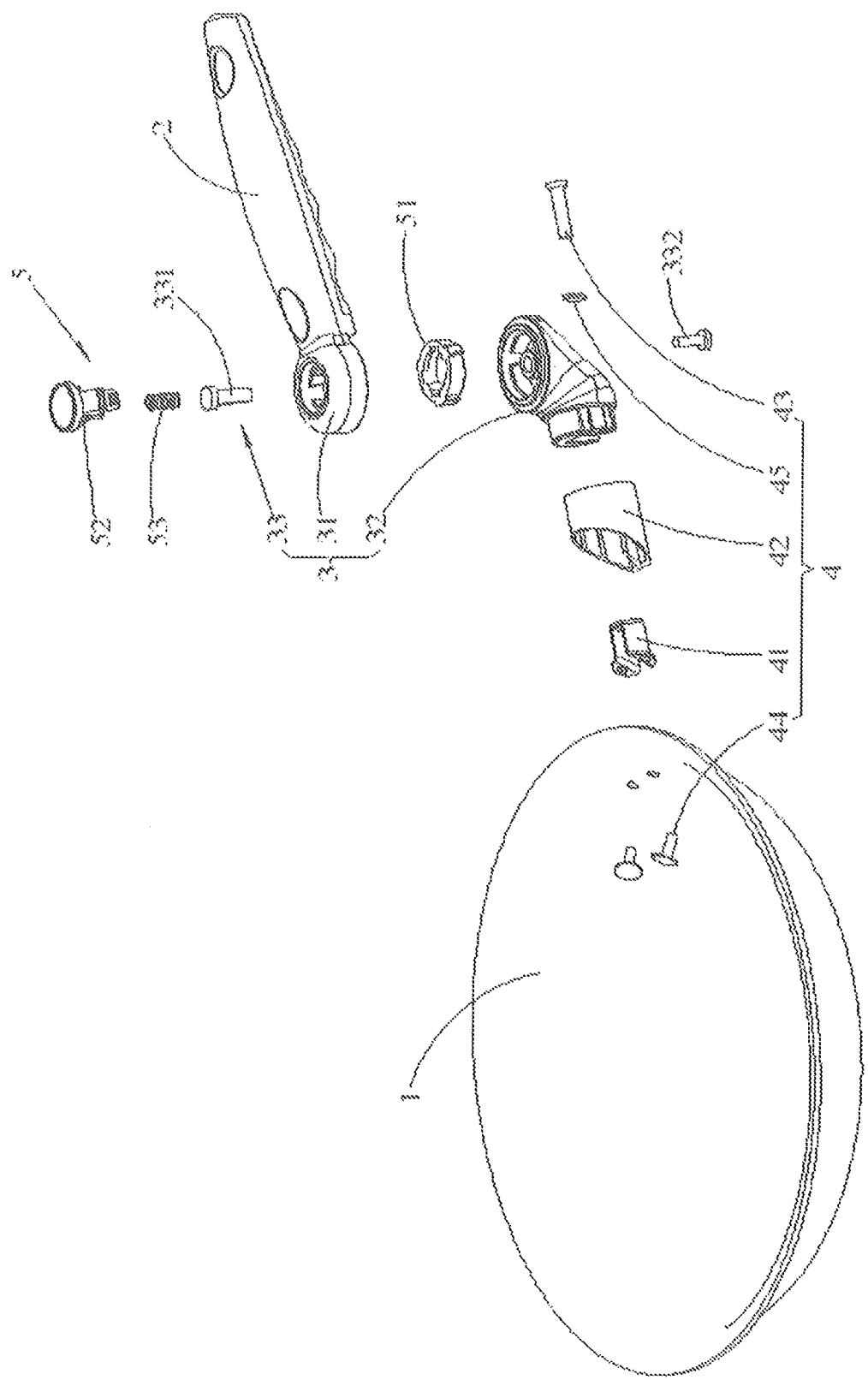
FIG. 1 is an exploded view of a foldable pan according to an embodiment of the present invention.
Figure 2:
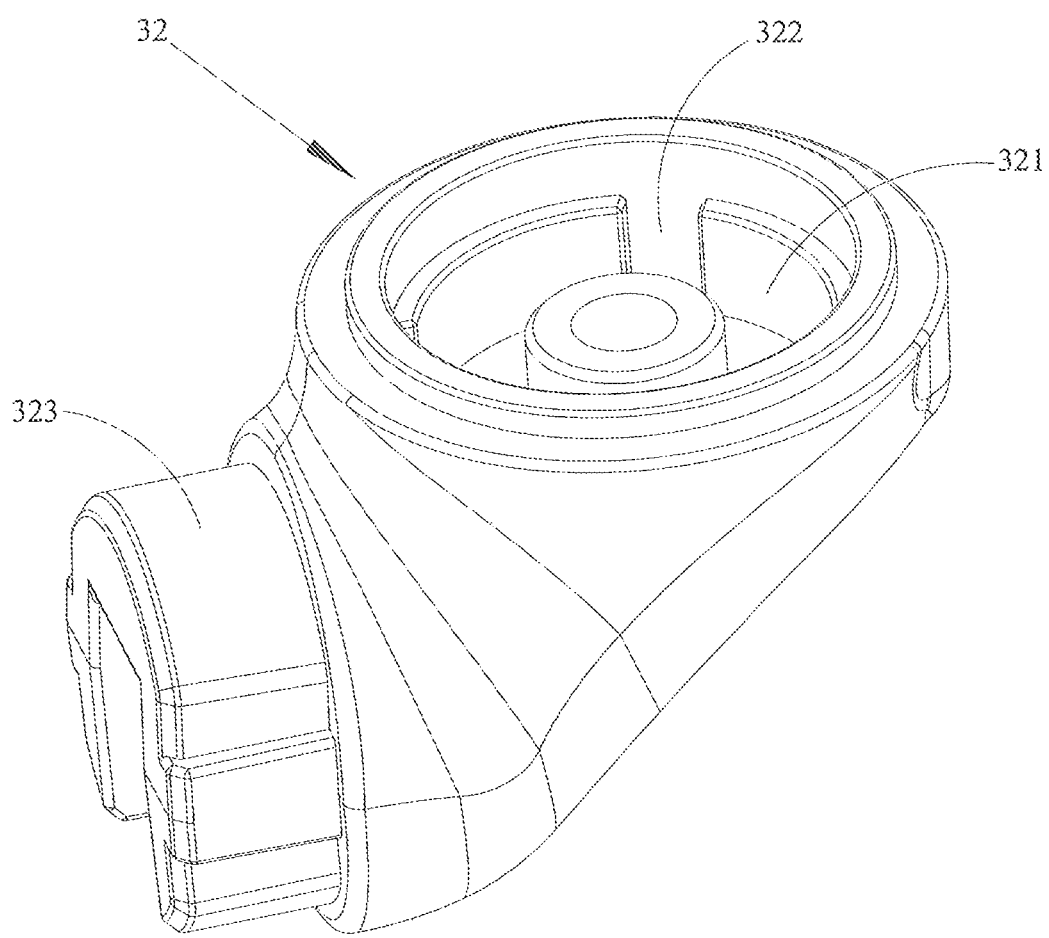
FIG. 2 is a schematic structure view of a base of the foldable pan according to the embodiment of the present invention.
Figure 3:
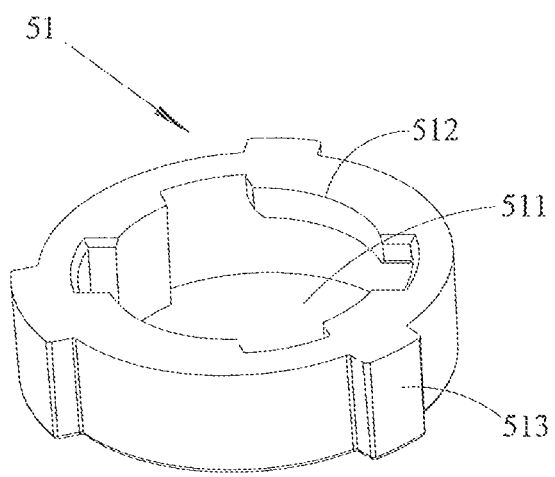
FIG. 3 is a schematic structure view of a rotation baffle ring according to the embodiment of the present invention.
Figure 4:
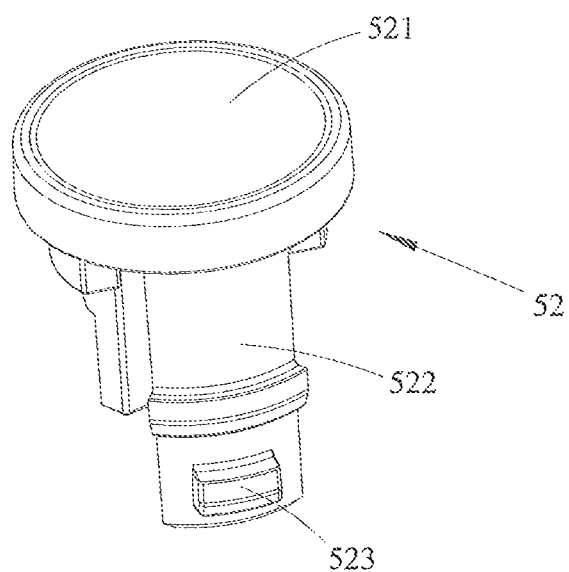
FIG. 4 is a schematic structure view of buttons according to the embodiment of the present invention.
Figure 5:
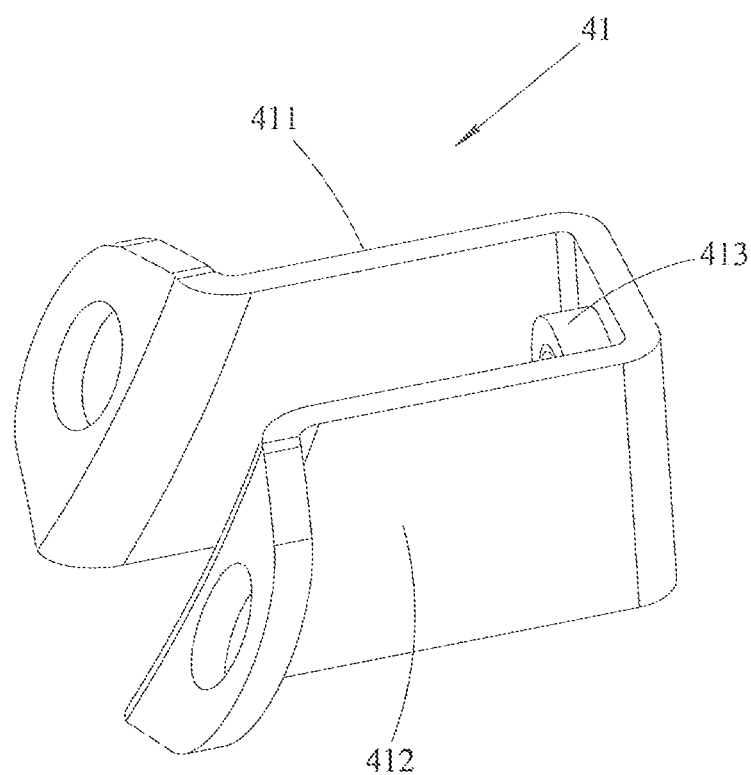
FIG. 5 is a schematic structure view of according to the embodiment of the present invention.

As shown in FIGS. 1-5, a preferred embodiment of the present invention is illustrated.

A foldable pan provided in the present embodiment includes a pan body 1 and a handle 2. The handle is formed at an outside of the pan body 1. Additionally, a horizontal rotation mechanism 3 is arranged between the pan body 1 and the handle 2. The handle 2 and the pan body 1 form a horizontal rotation connection by the horizontal rotation mechanism 3. Specifically, the horizontal rotation mechanism 3 includes a rotation head 31, a base 32, and a spindle assembly 33. The rotation head 31 is integratedly formed at an end of the handle 2. The spindle assembly 33 passes through a top of the base 32 and the rotation head 31 to form the horizontal rotation connection. Further, a bottom of the base 32 is fastened to the pan body 1 by a connection assembly 4. Thus, the handle 2 can rotate around a central line of spindle assembly 33, wherein the central line is act as an axis.

The foldable pan described above has characteristics below.

The foldable pan with a foldable handle provided in the present invention utilizes rotatably foldable handle, namely the handle 2 can be folded to contact against the outer wall of the pan body 1 by arranging the horizontal rotation mechanism 3 between the pan body 1 and the handle 2, thus reduces store space of the pan and is convenient to store, further the package volume is reduced after being folded, and correspondingly reduces transportation cost.

In the embodiment, the spindle assembly 33 includes a spindle 331 and a first screw 332. A baffle plate is arranged on an upper end of the spindle 331 and a screw hole is defined in a lower end of the spindle 331. A lower end of the first screw 332 has a nut. The first screw 332 engages with the screw hole. Specifically, the lower end of the spindle 331 passes through the rotation head 31 and the base 32 in turn from top to bottom. The baffle plate arranged on the upper end of the spindle 331 baffles against an upper side of the rotation head 31, meanwhile, the upper end of the first screw 332 extends into the screw hole of the spindle 331 to form a threaded connection. The nut of the lower end of the first screw 332 abuts against a lower side of the base 32. Further, gaps exists respectively between the spindle 331 and rotation head 31 and between the spindle 331 and the base 32, and thus causes the rotation head 31 and the base 32 being rotated relatively around the spindle 331.

In the embodiment, the foldable pan further includes a locking mechanism 5 for controlling the rotation of the handle 2 relative to the pan bode 1 by rotary positioning. The locking mechanism 5 includes a rotary baffle ring 51, a button 52, and a spring 53. The rotary baffle ring 51 is ring-shaped. The top of the base 32 defines a receiving slot 321. The rotary baffle ring 51 is received in the receiving slot 321. An upper end of the button 52 forms a press surface 521. A pair of symmetrical pole shaped pieces 522 extends downwardly from the press surface 521. After passing through the rotation head 31, the pole shaped pieces 522 extends into the receiving slot 321 and engages with the rotary baffle ring 51 received in the receiving slot 321. Meanwhile, the ring 53 is arranged between the rotation head 31 and the receiving slot 321. The two ends of the spring respectively resist against the back of the press surface 521 and the rotation head 31. In a normal state, the button 52 is raised by the spring 53. The pole shaped piece 522 on the end of the button 52 engages with the rotary baffle ring 51 by resisting against each other. In this situation, the handle 12 cannot be rotatably folded. When the button 52 is pressed by an external force, the pole shaped piece 522 is released from the rotary baffle ring 51, and then the handle 2 can be rotatably folded.

Additionally, three symmetrical positioning blocks 513 protrude outwardly from an outer wall of the rotary baffle ring 51. Correspondingly, an inner wall of the receiving slot 321 of the base 32 defines positioning slots 322 for engaging with the positioning blocks 513, and thus the rotary baffle ring 51 is received in the receiving slot 321 for positioning.

Further, a hole 511 is defined in the central of the rotary baffle ring 51. Three spaced baffle pieces 512 extends from an edge of the top of the hole 511. A protruding block 523 protrudes outwardly from an outer wall of the pole shaped piece 522 on the lower end of the button 52. The protruding block 523 engages with the baffle pieces 512 by abutting against each other. When the button 52 is pressed, the protruding block 523 of the pole shaped piece 522 passes downwardly through a space among the three spaces baffle pieces 512. By rotating the handle 2, the protruding block 523 is rotated beneath the baffle pieces 512 to form a resisting engagement for positioning.

In the embodiment, the connection assembly 4 includes a fixing member 41, a connecting member 42, and a second screw 43, wherein the fixing member 41 is shaped as a tab with bends. A first section 411 and the second section 412 at the two ends of the fixing member 41 are bended outwardly and contact the outer wall of the pan body 1. Further, two rivets 44 made of aluminum respectively fastens the first section 411 and the second section 412 to the pan body 1 after passing through the pan body 1. The middle section between the first section 411 and the second section 412 defines a screw hole 413. The middle section of the fixing member 41 extends to the lower end of the base 32. The second screw 43 passes through the lower end of the base 32 and then extends into the screw hole 413 to connect fixedly with the fixing member 41. Thus, the pan body 1 is fixedly connected to the base 32 through the fixing member 41. Meanwhile, a connection member 42 with a through chamber is wrapped around the peripheral of the fixing member 41. Further the two ends of the connection member 42 respectively resist against the outer wall of the pan body 1 and an outer edge of a connection end 323 of the lower portion of the base 32. For ensuring tight contact between the connection member 42 and the outer wall of the pan body 1, an edge of one end of the connection member 42 is an arc-shaped section, and a radian of the arc-shaped section is the same as the radian of the outer wall of the pan body 1. Additionally, a spring washer 45 is arranged between the fixing member 41 and the second screw 43.

The operation process of the foldable pan is described as followings: firstly, hand-holding the handle 2; pressing the press surface 521 of the top of the button 52; rotating the handle 2 to make it contact the pan body 1; and then releasing button 52 to form a rotation positioning.

The above described examples are only preferred embodiments of the present invention, but it should not be understood that they are intended to limit the invention to these embodiments. It should be noted that, to the person skilled in this art, the alternatives, modifications and equivalent to the embodiments may be included within the spirit and scope of the invention.

What is claimed is:

1. A foldable pan, comprising:
   a pan body, and
   a handle connected to an outside of the pan body,
   wherein a horizontal rotation mechanism is arranged between the handle and the pan body, the handle and the pan body form a horizontal rotation connection by the horizontal rotation mechanism, the horizontal rotation mechanism comprises a rotation head, a base, and a spindle assembly, the rotation head is formed at an end of the handle,
   wherein the spindle assembly passes through a top of the base and the rotation head to form the horizontal rotation connection, and a bottom of the base is fastened to the pan body by a connection assembly,
   wherein the spindle assembly comprises a spindle with a screw hole and a first screw engaging with the screw hole,
   wherein one end of the spindle passes through the rotation head and the base, the other end of the spindle is in contact with an upper side of the rotation head; one end of the first screw extends into the screw hole to form a connection, and the other end of the first screw presses against a lower side of the base, and
   wherein the foldable pan further comprises a locking mechanism for locking in position, the locking mechanism including a rotary baffle ring, a button, and a spring, the rotary baffle ring is arranged inside a top of the base, a lower end of the button passes through the rotation head and then extends inside the base to engage with the rotary baffle ring, the two ends of the spring press against the button and the rotation head, respectively.

2. The foldable pan as claimed in claim 1, wherein a hole is defined in the central portion of the rotary baffle ring, baffle pieces are extended inwardly from an edge of the top of the hole, protruding blocks are protruded outwardly from an outer wall of the lower end of the button and engaged with the baffle pieces.

3. The foldable pan as claimed in claim 1, further comprising: positioning blocks protruding outwardly from an outer wall of the rotary baffle ring, and positioning slots defined in an inner wall of the receiving slot of the base for engagement with the positioning blocks.

4. The foldable pan as claimed in claim 1, wherein the connection assembly comprises a fixing member, a connecting member, and a second screw, one end of the fixing member contacts the outer wall of the pan body and is fixed by a rivet, the other end of the fixing member extends inside the lower end of the base and is fastened by the second screw, the connection member is wrapped around the fixing member, further the two ends of the connection member are in contact with the pan body and the base, respectively.

5. The foldable pan as claimed in claim 4, wherein the fixing member is shaped as a tab with bends, the fixing member comprises a first section and a second section at its two ends, respectively, and the first section and the second section are bended outwardly and in contact with an outer wall of the pan body, two rivets made of aluminum respectively fasten the first section and the second section to the pan body after passing through the pan body.

6. The foldable pan as claimed in claim 5, wherein the fixing member further comprises a middle section between the first section and the second section that defines a screw hole, the middle section extends to the lower end of the base, the second screw passes through the lower end of the base and extends into the screw hole to connect fixedly with the fixing member.

7. The foldable pan as claimed in claim 6, wherein a spring washer is arranged between the fixing member and the second screw.

\* \* \* \* \*